US010032023B1

(12) United States Patent
Kuo

(10) Patent No.: US 10,032,023 B1
(45) Date of Patent: Jul. 24, 2018

(54) SYSTEMS AND METHODS FOR SELECTIVELY APPLYING MALWARE SIGNATURES

(71) Applicant: Symantec Corporation, Mountain View, CA (US)

(72) Inventor: Chengi Kuo, Manhattan Beach, CA (US)

(73) Assignee: Symantec Corporation, Mountain View, CA (US)

(*) Notice: Subject to any disclaimer, the term of this patent is extended or adjusted under 35 U.S.C. 154(b) by 155 days.

(21) Appl. No.: 15/080,621

(22) Filed: Mar. 25, 2016

(51) Int. Cl.
*G06F 21/56* (2013.01)
*G06F 21/55* (2013.01)

(52) U.S. Cl.
CPC ............ *G06F 21/566* (2013.01); *G06F 21/55* (2013.01)

(58) Field of Classification Search
CPC .. G06F 21/566; G06F 21/55; H04L 29/06911; H04L 29/06925; H04L 29/06931; H04L 29/06938
USPC .......................................................... 726/23
See application file for complete search history.

(56) References Cited

U.S. PATENT DOCUMENTS

| | | | | | |
|---|---|---|---|---|---|
| 5,591,698 | A * | 1/1997 | Song | .................... | C04B 35/4508 252/519.1 |
| 5,832,208 | A * | 11/1998 | Chen | ..................... | G06F 21/564 709/206 |
| 6,035,423 | A * | 3/2000 | Hodges | ..................... | G06F 8/65 709/219 |
| 7,523,502 | B1 * | 4/2009 | Kennedy | ............... | G06F 21/554 709/201 |
| 7,818,807 | B1 * | 10/2010 | McCorkendale | ..... | G06F 21/562 713/165 |
| 7,854,006 | B1 * | 12/2010 | Andruss | ................ | G06F 21/562 726/22 |
| 7,917,954 | B1 * | 3/2011 | Zaitsev | ............... | G06F 11/3051 726/23 |
| 8,151,109 | B2 * | 4/2012 | Fanton | .................... | G06F 21/10 380/270 |
| 8,171,552 | B1 * | 5/2012 | Chang | .................... | G06F 21/56 709/223 |

(Continued)

OTHER PUBLICATIONS

Windows 10, https://www.microsoft.com/en-us/windows, as accessed Mar. 2, 2016, Microsoft, (Jun. 12, 2009).

*Primary Examiner* — Eleni A Shiferaw
*Assistant Examiner* — Shahriar Zarrineh
(74) *Attorney, Agent, or Firm* — FisherBroyles, LLP

(57) ABSTRACT

A computer-implemented method for selectively applying malware signatures may include (1) receiving a time-sensitive malware signature at a receiving time to apply to a computing environment, (2) identifying a first target object observed within the computing environment at a first observation time, (3) deactivating the time-sensitive malware signature with respect to the first target object based on a difference between the receiving time and the first observation time, (4) observing a second target object within the computing environment subject to malware scans, the second target object being observed within the computing environment at a second observation time that is later than the first observation time, and (5) activating the time-sensitive malware signature with respect to the second target object based on a difference between the receiving time and the second observation time. Various other methods, systems, and computer-readable media are also disclosed.

20 Claims, 7 Drawing Sheets

(56) References Cited

U.S. PATENT DOCUMENTS

| | | | | |
|---|---|---|---|---|
| 8,443,449 B1* | 5/2013 | Fan | G06F 21/564 | 713/188 |
| 8,621,634 B2* | 12/2013 | Turbin | G06F 21/562 | 706/62 |
| 8,726,391 B1* | 5/2014 | Zhong | G06F 21/56 | 726/25 |
| 8,813,221 B1* | 8/2014 | Dubrovsky | H04L 63/1408 | 726/22 |
| 8,875,292 B1* | 10/2014 | Bogorad | G06F 21/564 | 726/24 |
| 9,323,930 B1* | 4/2016 | Satish | H04L 63/1433 | |
| 9,473,527 B1* | 10/2016 | Zheng | G06F 21/564 | |
| 2003/0126449 A1* | 7/2003 | Kelly | G06F 21/56 | 713/187 |
| 2003/0233574 A1* | 12/2003 | Kouznetsov | G06F 21/56 | 726/23 |
| 2005/0132184 A1* | 6/2005 | Palliyil | G06F 21/56 | 713/152 |
| 2005/0132206 A1* | 6/2005 | Palliyil | G06F 21/566 | 713/188 |
| 2005/0149749 A1* | 7/2005 | Van Brabant | G06F 21/564 | 726/24 |
| 2005/0204151 A1* | 9/2005 | Fang | H04L 63/0227 | 713/188 |
| 2006/0174344 A1* | 8/2006 | Costea | G06F 21/564 | 726/24 |
| 2006/0218637 A1* | 9/2006 | Thomas | G06F 21/51 | 726/23 |
| 2006/0236398 A1* | 10/2006 | Trakic | G06F 21/562 | 726/24 |
| 2006/0288416 A1* | 12/2006 | Costea | G06F 21/51 | 726/24 |
| 2007/0083930 A1* | 4/2007 | Dumont | G06F 21/565 | 726/24 |
| 2007/0180529 A1* | 8/2007 | Costea | G06F 21/567 | 726/24 |
| 2007/0240222 A1* | 10/2007 | Tuvell | G06F 21/56 | 726/24 |
| 2007/0256075 A1* | 11/2007 | Denis | G06F 9/4843 | 718/102 |
| 2008/0141375 A1* | 6/2008 | Amundsen | G06F 21/562 | 726/24 |
| 2009/0064335 A1* | 3/2009 | Sinn | G06F 21/562 | 726/24 |
| 2009/0199297 A1* | 8/2009 | Jarrett | G06F 21/566 | 726/24 |
| 2009/0282483 A1* | 11/2009 | Bennett | H04L 63/1416 | 726/23 |
| 2009/0328221 A1* | 12/2009 | Blumfield | G06F 21/564 | 726/24 |
| 2011/0093670 A1* | 4/2011 | Cherian | G06F 3/0613 | 711/156 |
| 2011/0126286 A1* | 5/2011 | Nazarov | G06F 21/564 | 726/24 |
| 2011/0191850 A1* | 8/2011 | Turbin | G06F 11/00 | 726/24 |
| 2012/0023579 A1* | 1/2012 | Zaitsev | G06F 21/56 | 726/23 |
| 2012/0117348 A1* | 5/2012 | Triantafillou | G06F 21/566 | 711/163 |
| 2012/0240230 A1* | 9/2012 | Lee | G06F 21/564 | 726/24 |
| 2012/0272320 A1* | 10/2012 | Rados | G06F 21/564 | 726/24 |
| 2012/0297486 A1* | 11/2012 | Turbin | G06F 21/562 | 726/24 |
| 2014/0007239 A1* | 1/2014 | Sharpe | G06F 21/561 | 726/24 |
| 2014/0090062 A1* | 3/2014 | Guo | G06F 21/566 | 726/24 |
| 2015/0101055 A1* | 4/2015 | Tang | G06F 21/562 | 726/24 |
| 2016/0112284 A1* | 4/2016 | Pon | H04L 43/045 | 709/224 |
| 2017/0091455 A1* | 3/2017 | Levchenko | G06F 21/566 | |
| 2017/0142076 A1* | 5/2017 | Ford | H04L 63/0428 | |

* cited by examiner

SYSTEMS AND METHODS FOR SELECTIVELY APPLYING MALWARE SIGNATURES

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems.

Many security software companies attempt to combat malware by creating and deploying malware signatures. These signatures may match patterns observed in malware code and/or malware behavior. However, malware authors may regularly modify their malware in an attempt to circumvent commonly employed signature-based malware-detection mechanisms. In particular, in an attempt to evade detection, malware authors may refine malware such that it becomes difficult to distinguish from legitimate programs.

Accordingly, security software companies may face serious tradeoffs. Each new malware signature has the potential to detect malware variants that might otherwise go undetected. However, each new malware signature also poses the risk of generating a false positive (i.e., incorrectly classifying legitimate software as malware). False positives can be particularly disruptive to consumers and businesses when security software takes action against legitimate software.

Accordingly, the instant disclosure identifies and addresses a need for additional and improved systems and methods for selectively applying malware signatures.

SUMMARY

As will be described in greater detail below, the instant disclosure generally relates to systems and methods for selectively applying malware signatures by activating certain time-sensitive malware signatures with respect to certain scannable target objects based at least in part on when the time-sensitive malware signatures were received relative to when the scannable target objects have been observed. Thus, in some examples, these systems and methods may apply time-sensitive malware signatures to target objects that appear within a computing environment after the time-sensitive malware signature is deployed to the computing environment but not to target objects that appear within the computing environment before the time-sensitive malware signature is deployed to the computing environment. In some examples, these systems and methods may delay activating a time-sensitive malware signature for a window of time (during which, e.g., the time-sensitive malware signature may operate in a "silent" mode that processes detections without triggering overt security responses) and then automatically activate the time-sensitive malware signature after the window of time.

In one example, a computer-implemented method for selectively applying malware signatures may include (1) receiving a time-sensitive malware signature at a receiving time to apply to a computing environment, (2) identifying a first target object within the computing environment subject to malware scans, the first target object being observed within the computing environment at a first observation time, (3) deactivating the time-sensitive malware signature with respect to the first target object based at least in part on a difference between the receiving time and the first observation time, (4) observing a second target object within the computing environment subject to malware scans, the second target object being observed within the computing environment at a second observation time that is later than the first observation time, and (5) activating the time-sensitive malware signature with respect to the second target object based at least in part on a difference between the receiving time and the second observation time.

In one embodiment, deactivating the time-sensitive malware signature with respect to the first target object based at least in part on the difference between the receiving time and the first observation time may include deactivating the time-sensitive malware signature with respect to the first target object based at least in part on the first observation time preceding the receiving time and activating the time-sensitive malware signature with respect to the second target object based at least in part on the difference between the receiving time and the second observation time may include activating the time-sensitive malware signature with respect to the second target object based at least in part on the receiving time preceding the second observation time.

In some examples, the computer-implemented method may further include activating the time-sensitive malware signature with respect to the first target object after a predetermined window of time.

In one embodiment, the predetermined window of time may end after the time-sensitive malware signature does not match any observed target objects within the computing environment for a predetermined amount of time.

In one embodiment, the computer-implemented method may further include sending an indication to a distributor of the time-sensitive malware signature, while the time-sensitive malware signature is deactivated, that the time-sensitive malware signature matches the first target object and receiving from the distributor, in response to sending the indication, a modified version of the time-sensitive malware signature that does not match the first target object to replace the time-sensitive malware signature.

In one embodiment, the computer-implemented method may further include sending an indication to a distributor of the time-sensitive malware signature, while the time-sensitive malware signature is deactivated, that the time-sensitive malware signature matches the first target object and receiving from the distributor, in response to sending the indication, an instruction to extend the predetermined window of time and, thereby, delay activating the time-sensitive malware signature within the computing environment.

In one embodiment, the computer-implemented method may further include sending an indication to a distributor of the time-sensitive malware signature, while the time-sensitive malware signature is deactivated, that the time-sensitive malware signature matches the first target object and receiving from the distributor, in response to sending the indication, an instruction to include the first target object in a whitelist.

In some examples, deactivating the time-sensitive malware signature with respect to the first target object may include silently comparing the time-sensitive malware signature to the first target object and sending a comparison result to a distributor of the time-sensitive malware signature.

In some examples, deactivating the time-sensitive malware signature with respect to the first target object may include putting the first target object on a whitelist based at least in part on the difference between the receiving time and the first observation time.

In some examples, putting the first target object on the whitelist may include putting the first target object on a whitelist specific to the time-sensitive malware signature that exempts the first target object from the time-sensitive malware signature.

In one embodiment, the computer-implemented method may further include (1) receiving a non-time-sensitive malware signature at a second receiving time to apply to the computing environment, (2) applying the non-time-sensitive malware signature to the first target object regardless of a difference between the second receiving time and the first observation time, and (3) applying the non-time-sensitive malware signature to the second target object regardless of a difference between the second receiving time and the second observation time.

In one embodiment, a system for implementing the above-described method may include (1) a receiving module, stored in memory, that receives a time-sensitive malware signature at a receiving time to apply to a computing environment, (2) an identification module, stored in memory, that identifies a first target object within the computing environment subject to malware scans, the first target object being observed within the computing environment at a first observation time, (3) a deactivation module, stored in memory, that deactivates the time-sensitive malware signature with respect to the first target object based at least in part on a difference between the receiving time and the first observation time, (4) an observation module, stored in memory, that observes a second target object within the computing environment subject to malware scans, the second target object being observed within the computing environment at a second observation time that is later than the first observation time, (5) an activation module, stored in memory, that activates the time-sensitive malware signature with respect to the second target object based at least in part on a difference between the receiving time and the second observation time, and (6) at least one physical processor configured to execute the receiving module, the identification module, the deactivation module, the observation module, and the activation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a time-sensitive malware signature at a receiving time to apply to a computing environment, (2) identify a first target object within the computing environment subject to malware scans, the first target object being observed within the computing environment at a first observation time, (3) deactivate the time-sensitive malware signature with respect to the first target object based at least in part on a difference between the receiving time and the first observation time, (4) observe a second target object within the computing environment subject to malware scans, the second target object being observed within the computing environment at a second observation time that is later than the first observation time, and (5) activate the time-sensitive malware signature with respect to the second target object based at least in part on a difference between the receiving time and the second observation time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
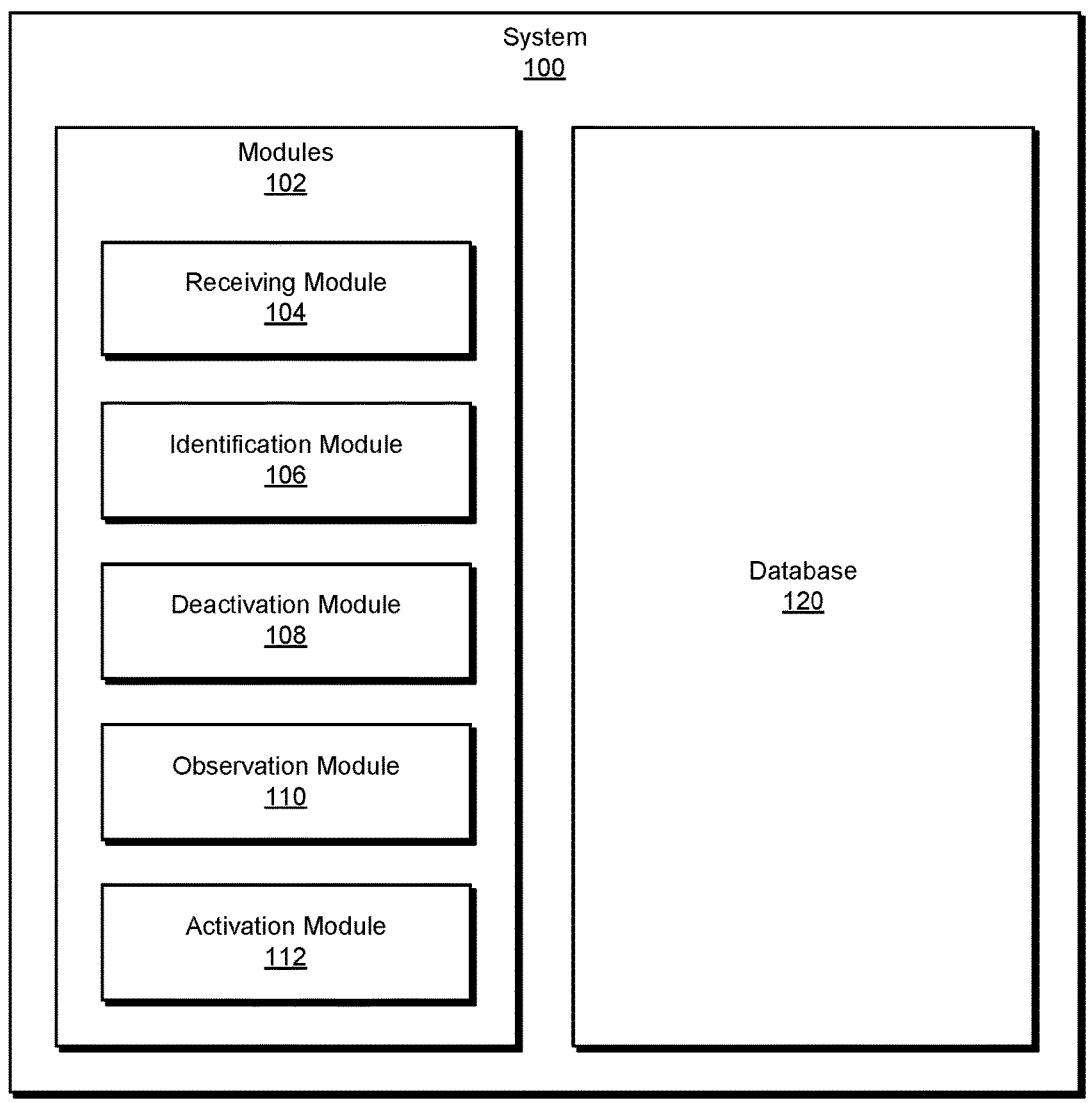
FIG. 1 is a block diagram of an exemplary system for selectively applying malware signatures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selectively applying malware signatures. As will be explained in greater detail below, by activating certain time-sensitive malware signatures with respect to certain scannable target objects based at least in part on when the time-sensitive malware signatures were received relative to when the scannable target objects have been observed, the systems and methods described herein may immediately make use of malware signatures (e.g., to reduce false negatives in malware detection) while avoiding the disruption that may be caused when false positives occur within existing software systems upon which a consumer may rely. Thus, in some examples, by applying time-sensitive malware signatures to target objects that appear within a computing environment after the time-sensitive malware signature is deployed to the computing environment but not to target objects that appear within the computing environment before the time-sensitive malware signature is deployed to the computing environment, these systems and methods may prevent new threats without disrupting existing systems. In addition, in some examples, by delaying activating a time-sensitive malware signature for a window of time, and then automatically activating the time-sensitive malware signature after the window of time, these systems and methods may provide time for security software vendors to observe and refine the operation and/or application of the time-sensitive malware signature to prevent the time-sensitive malware signature from disrupting legitimate elements of existing systems.

Figure 2:
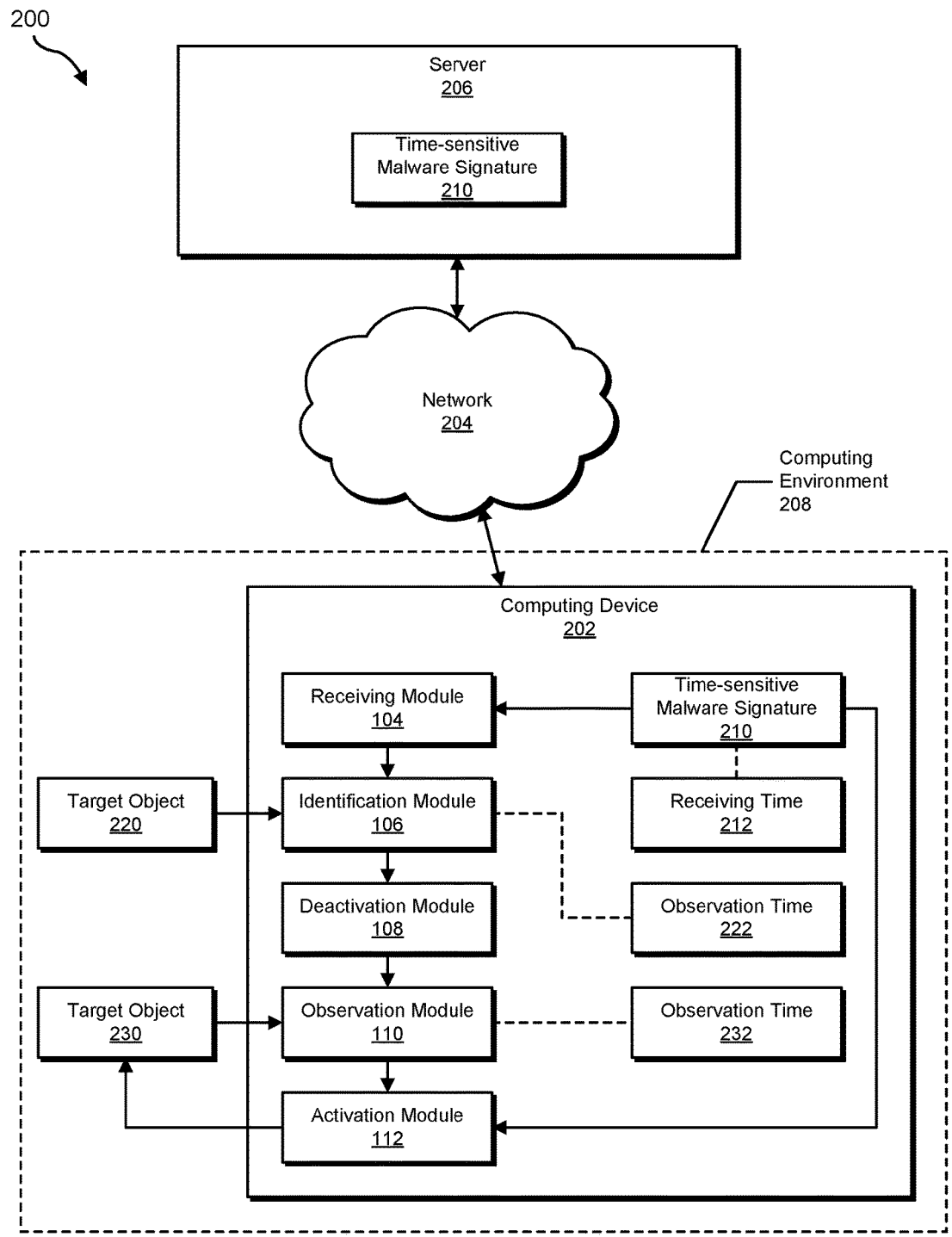
FIG. 2 is a block diagram of an additional exemplary system for selectively applying malware signatures.

The following will provide, with reference to FIGS. 1-2, detailed descriptions of exemplary systems for selectively applying malware signatures. Detailed descriptions of corresponding computer-implemented methods will also be provided in connection with FIG. 3. Detailed descriptions of exemplary timelines for selectively applying malware signatures will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for selectively applying malware signatures. As illustrated in this figure, exemplary system 100 may include one or more modules 102 for performing one or more tasks. For example, and as will be explained in greater detail below, exemplary system 100 may include a receiving module 104 that receives a time-sensitive malware signature at a receiving time to apply to a computing environment. Exemplary system 100 may additionally include an identification module 106 that identifies a first target object within the computing environment subject to malware scans, the first target object being observed within the computing environment at a first observation time. Exemplary system 100 may also include a deactivation module 108 that deactivates the time-sensitive malware signature with respect to the first target object based at least in part on a difference between the receiving time and the first observation time. Exemplary system 100 may additionally include an observation module 110 that observes a second target object within the computing environment subject to malware scans, the second target object being observed within the computing environment at a second observation time that is later than the first observation time. Exemplary system 100 may also include an activation module 112 that activates the time-sensitive malware signature with respect to the second target object based at least in part on a difference between the receiving time and the second observation time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more malware signatures and/or results from malware scans using malware signatures.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to selectively applying malware signatures. For example, and as will be described in greater detail below, one or more of modules 102 may cause computing device 202 to selectively apply a time-sensitive malware signature 210 received from server 206 to a computing environment 208. For example, and as will be described in greater detail below, receiving module 104 may receive time-sensitive malware signature 210 at a receiving time 212 to apply to computing environment 208. Identification module 106 may identify a target object 220 within computing environment 208 subject to malware scans, target object 220 being observed within computing environment 208 at an observation time 222. Deactivation module 108 may deactivate time-sensitive malware signature 210 with respect to target object 220 based at least in part on a difference between receiving time 212 and observation time 222. Observation module 110 may observe a target object 230 within computing environment 208 subject to malware scans, target object 230 being observed within computing environment 208 at an observation time 232 that is later than observation time 222. Activation module 112 may activate time-sensitive malware signature 210 with respect to target object 230 based at least in part on a difference between receiving time 212 and observation time 232.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing, comparing, and/or providing data. Examples of server 206 include, without limitation, application servers and database servers configured to provide various database services and/or run certain software applications. For example, server 206 may represent a security server configured to provide anti-malware information for client devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
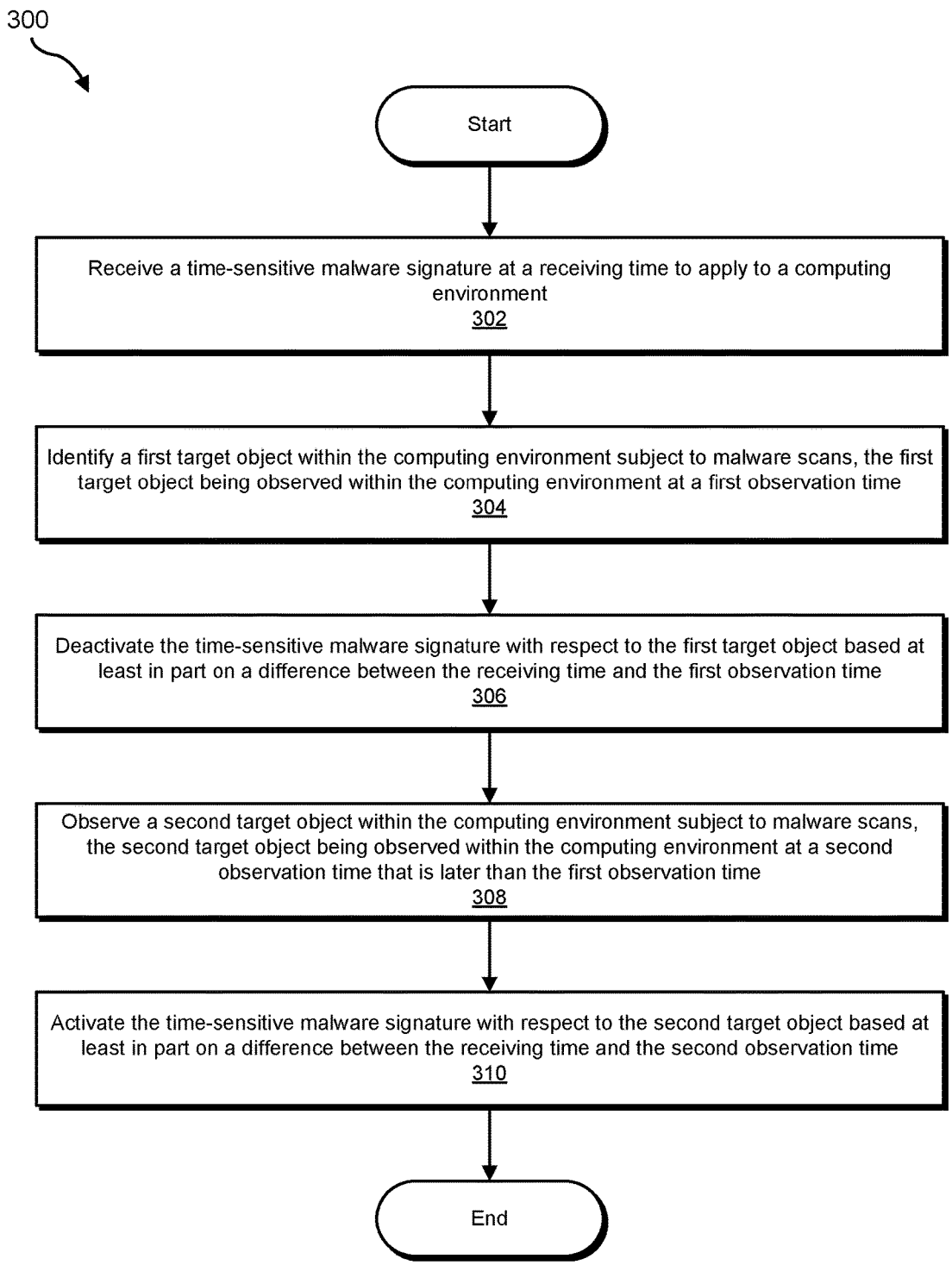
FIG. 3 is a flow diagram of an exemplary method for selectively applying malware signatures.

FIG. 3 is a flow diagram of an exemplary computer-implemented method 300 for selectively applying malware signatures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may receive a time-sensitive malware signature at a receiving time to apply to a computing environment. For example, receiving module 104 may, as part of computing device 202 in FIG. 2, receive time-sensitive malware signature 210 at receiving time 212 to apply to computing environment 208.

The term "malware signature," as used herein, may refer to any fingerprint, hash, defined pattern, and/or any other representation or identifying characteristic of malware and/or a variant, family, and/or strain of malware. In some examples, a malware signature may describe stored data (e.g., malware code). Additionally or alternatively, a malware signature may describe behavior (e.g., one or more actions taken by malware and/or a computing environment infected with malware).

The term "time-sensitive malware signature," as used herein, generally refers any malware signature that is selectively activated and/or applied to observed target objects based at least in part on the time that the time-sensitive malware signature was received (e.g., downloaded, pushed, and/or deployed) relative to the target objects.

The term "computing environment," as used herein, may refer to an environment hosted by, established by, and/or composed of any computing subsystem, computing system, and/or collection of interconnected and/or interoperating computing systems that are subject to malware scans and/or that perform malware scans.

Receiving module 104 may receive the time-sensitive malware signature in any suitable context. For example, receiving module 104 may operate as a part of an anti-malware system that receives periodic signature updates (e.g., from a security system vendor). Accordingly, in one example, receiving module 104 may receive the time-sensitive malware signature as part of a signature update. In some examples, the signature update may include one or more malware signatures distributed to one or more computing environments by a security system vendor. In some examples, the time-sensitive malware signature may be distinguished as a time-sensitive malware signature (as opposed to a non-time-sensitive malware signature). For example, an identifier of the time-sensitive malware signature may designate the time-sensitive malware signature as time-sensitive. Additionally or alternatively, the time-sensitive malware signature may be grouped with time-sensitive malware signatures (e.g., stored, ordered, and/or logically set apart from other malware signatures).

In some examples, receiving module 104 may record when the time-sensitive malware signature was received within and/or installed within the computing environment. Additionally or alternatively, receiving module 104 may record when the time-sensitive malware signature was first applied (e.g., silently) within the computing environment. In some examples, receiving module 104 may record when the time-sensitive malware signature was applied (e.g., silently) to all target objects present within the computing environment at the time the malware signature was received. Additionally or alternatively, receiving module 104 may record the first time when the time-sensitive malware signature has been applied (e.g., silently) to all target objects found within the computing environment at the time. In some examples, one or more of the times discussed above which receiving module 104 may record may be referred to as and/or measured against the "receiving time."

Returning to FIG. 3, at step 304, one or more of the systems described herein may identify a first target object within the computing environment subject to malware scans, the first target object being observed within the computing environment at a first observation time. For example, identification module 106 may, as part of computing device 202 in FIG. 2, identify target object 220 within computing environment 208 subject to malware scans, target object 220 being observed within computing environment 208 at observation time 222.

The term "target object," as used herein, generally refers to any file, data object, program, process, application, and/or computing system configuration that may be subject to a malware scan and/or which may be modified, removed, quarantined, restricted, flagged, and/or sandboxed by a security system as a result of a malware scan. In some examples, the target object may include a dynamic object and/or an object created by the dynamic process of an underlying object. For example, the target object may include a polymorphic object (and/or the result of a polymorphic behavior) and/or a mobile agent (e.g., an object that migrates from one part of the computing environment to another and/or from outside the computing environment to inside the computing environment).

The term "malware scan," as used herein, generally refers to process whereby a malware signature may be compared to a target object to determine whether the target object is implicated as malware and/or involved in malware activity.

Identification module 106 may identify the first target object in any suitable context. For example, identification module 106 may identify the first target object in the course of performing a malware scan. For example, identification module 106 may identify the first target object as a stored data object, as a data object in execution, as a data object in a transfer, as an entity catalogued within the computing environment (e.g., in a list of files, applications, settings, etc.). Accordingly, in some examples identification module 106 may apply one or more malware signatures to the first target object to see if the first target object matches any of the malware signatures. Additionally or alternatively, identification module 106 may record the existence, location, and/or content of the first target object for one or more future malware scans. In some examples, identification module 106 may identify the first data object by receiving an identifier of the first data object from another subsystem (e.g., an anti-malware subsystem).

In some examples, identification module 106 may record and/or identify when the first target object was observed within the computing environment. For example, identification module 106 may identify when the first target object was first observed within the computing environment (e.g., by an anti-malware system, by a file system, and/or by an application). Additionally or alternatively, identification module 106 may identify when the first target object was transmitted to, written within, modified within, executed within, created within, and/or installed within the computing environment. In some examples, identification module 106 may identify the first target object as being recorded within a data structure that identifies target objects within the computing environment and which is used by an anti-malware system as a list of target objects to scan.

Returning to FIG. 3, at step 306, one or more of the systems described herein may deactivate the time-sensitive malware signature with respect to the first target object based at least in part on a difference between the receiving time and the first observation time. For example, deactivation module 108 may, as part of computing device 202 in FIG. 2, deactivate time-sensitive malware signature 210 with respect to target object 220 based at least in part on a difference between receiving time 212 and observation time 222.

Deactivation module 108 may deactivate the time-sensitive malware signature in any suitable manner. For example, deactivation module 108 may deactivate the time-sensitive malware signature with respect to the first target object by putting the first target object on a whitelist based at least in part on the difference between the receiving time and the first observation time. For example, as will be explained in greater detail below, deactivation module 108 may determine that the first target object existed within the computing environment before the time-sensitive malware signature was deployed to the computing environment, and so place the first target object on the whitelist. Additionally or alternatively, as will be explained in greater detail below, deactivation module 108 may determine that the first target object was observed within the computing environment before a window of time has passed, and so may place the first target object on the whitelist. In some examples, systems described herein may not apply the time-sensitive malware signature to target objects on the whitelist. Additionally or alternatively, systems described herein may only silently compare the time-sensitive malware signature to target objects on the whitelist.

In some examples, deactivation module 108 may put the first target object on a whitelist specific to the time-sensitive malware signature that exempts the first target object from the time-sensitive malware signature. For example, the whitelist may not exempt the first target object from one or more additional malware signatures (including, in some example, one or more additional time-sensitive malware signatures). In some examples, the whitelist may exempt the first target object from a group of malware signatures that includes the time-sensitive malware signature.

In some examples, deactivation module 108 may deactivate the time-sensitive malware signature by placing the time-sensitive malware signature in a group of malware signatures designated for potential future active use and/or a group of malware signatures designated for silent use (i.e., for matching the malware signatures against target objects, but maintaining and/or transmitting records describing the matches without performing other specified remediation actions).

Deactivation module 108 may deactivate the time-sensitive malware signature with any of a variety of time-sensitive approaches. For example, deactivation module 108 may deactivate the time-sensitive malware signature with respect to the first target object based at least in part on the first observation time preceding the receiving time. For example, deactivation module 108 may deactivate the time-sensitive malware signature with respect to the first target object based on the first target object existing within the computing environment prior to the time-sensitive malware signature being deployed to the computing environment. Additionally or alternatively, deactivation module 108 may deactivate the time-sensitive malware signature based on the first target object being checked against the time-sensitive malware signature before the time-sensitive malware signature could be applied to the entire computing environment (e.g., at least one time and/or over a minimum period of time).

In some examples, one or more of the systems described herein may activate the time-sensitive malware signature with respect to the first target object after a predetermined window of time. For example, deactivation module 108 may end the deactivation of the time-sensitive malware signature (e.g., may activate the time-sensitive malware signature) after a specified period time has elapsed following the deployment of the time-sensitive malware signature within the computing environment. In some examples, the window of time may begin with the deployment of the time-sensitive malware signature in the computing environment and end after a specified amount of time (e.g., 24 hours, one week, four weeks, etc.). Additionally or alternatively, the predetermined window of time may end on a dynamic basis. For example, the predetermined window of time may end after the time-sensitive malware signature does not match any observed target objects within the computing environment for a predetermined amount of time. In one example, the time-sensitive malware signature may be set to activate one week after being deployed within the computing environment. However, the week-long window may be shifted and/or extended in response to the time-sensitive malware signature matching a target object (e.g., during a silent matching procedure). Accordingly, deactivation module 108 may maintain the time-sensitive malware signature in a deactivated state until a week has passed without the time-sensitive malware signature matching any target object. As mentioned earlier, in some examples, target objects may include legitimate dynamic objects (e.g., legitimate polymorphic objects and/or legitimate mobile agents). Accordingly, in some examples a target object may appear (e.g., from the perspective of an anti-malware system) to first appear after the time-sensitive malware signature was deployed, even though the target object may represent the result of a pre-existing dynamic element of the computing environment. Accordingly, by providing a window of time of silence for the time-sensitive malware signature following the arrival of the time-sensitive malware signature, the systems described herein may avoid prematurely acting on false positives corresponding to legitimate pre-existing objects within the computing environment.

The time-sensitive malware signature may be inactive (e.g., in a deactivated state) in any suitable manner. For example, the time-sensitive malware signature may remain unused for checks against one or more target objects. Additionally or alternatively, the time-sensitive malware signature may be applied silently rather than actively. For example, the time-sensitive malware signature may be compared and the results of the comparison may recorded, stored, and/or transmitted. In some examples, deactivation module 108 may deactivate the time-sensitive malware signature with respect to the first target object by silently comparing the time-sensitive malware signature to the first target object and sending a comparison result to a distributor of the time-sensitive malware signature. The comparison result may include any of a variety of information. For example, deactivation module 108 may send information identifying the time-sensitive malware signature, information identifying the computing environment, information identifying the first target object, information describing the first target object, information describing the computing environment, and/or information describing the context in which the time-sensitive malware signature was compared to the first target object to the distributor. In some examples, deactivation module 108 may additionally send follow-up information regarding the first target object, the computing environment, and/or the application of the time-sensitive malware signature within the computing environment to the distributor.

In one example, deactivation module 108 may send an indication to a distributor of the time-sensitive malware signature, while the time-sensitive malware signature is deactivated, that the time-sensitive malware signature matches the first target object and receive from the distributor, in response to sending the indication, a modified version of the time-sensitive malware signature that does not match the first target object to replace the time-sensitive malware signature. In this example, the distributor may have investigated the first target object to determine that the first target object is legitimate and that, therefore, modifying the time-sensitive malware signature could avoid a false positive.

In some examples, the distributor may avoid a false positive by altering the time-sensitive malware signature itself. Additionally or alternatively, the distributor may add the first target object to a whitelist (e.g., a whitelist local to the computing environment and/or a global whitelist applicable to other computing environments as well) to prevent the time-sensitive malware signature from being applied against the first target object in the future. Accordingly, in one example, deactivation module 108 may send an indication to a distributor of the time-sensitive malware signature, while the time-sensitive malware signature is deactivated, that the time-sensitive malware signature matches the first target object and may receive from the distributor, in response to sending the indication, an instruction to include the first target object in a whitelist.

In some examples, a distributor may wish to delay activation of the time-sensitive malware signature (e.g., to provide more time to adjust the time-sensitive malware signature and/or to collect additional information without causing false positives). Accordingly, in one example, deactivation module 108 may send an indication to a distributor of the time-sensitive malware signature, while the time-sensitive malware signature is deactivated, that the time-sensitive malware signature matches the first target object and may receive from the distributor, in response to sending the indication, an instruction to extend the predetermined window of time and, thereby, delay activating the time-sensitive malware signature within the computing environment.

Returning to FIG. 3, at step 308, one or more of the systems described herein may observe a second target object within the computing environment subject to malware scans, the second target object being observed within the computing environment at a second observation time that is later than the first observation time. For example, observation module 110 may, as part of computing device 202 in FIG. 2, observe target object 230 within computing environment 208 subject to malware scans, target object 230 being observed within computing environment 208 at observation time 232 that is later than observation time 222.

Observation module 110 may observe the second target object in any suitable context. For example, observation module 110 may observe the second target object in the course of performing a malware scan. For example, observation module 110 may identify the second target object as a stored data object, as a data object in execution, as a data object in a transfer, as an entity catalogued within the computing environment (e.g., in a list of files, applications, settings, etc.). Accordingly, in some examples observation module 110 may apply one or more malware signatures to the second target object to see if the second target object matches any of the malware signatures. Additionally or alternatively, observation module 110 may record the existence, location, and/or content of the second target object for one or more future malware scans. In some examples, observation module 110 may observe the second data object by receiving an identifier of the second data object from another subsystem (e.g., an anti-malware subsystem).

In some examples, observation module 110 may record and/or identify when the second target object was observed within the computing environment. For example, observation module 110 may identify when the second target object was first observed within the computing environment (e.g., by an anti-malware system, by a file system, and/or by an application). Additionally or alternatively, observation module 110 may identify when the second target object was transmitted to, written within, modified within, executed within, created within, and/or installed within the computing environment. In some examples, observation module 110 may identify the second target object as being recorded within a data structure that identifies target objects within the computing environment and which is used by an anti-malware system as a list of target objects to scan.

Returning to FIG. 3, at step 310, one or more of the systems described herein may activate the time-sensitive malware signature with respect to the second target object based at least in part on a difference between the receiving time and the second observation time. For example, activation module 112 may, as part of computing device 202 in FIG. 2, activate time-sensitive malware signature 210 with respect to target object 230 based at least in part on a difference between receiving time 212 and observation time 232.

Activation module 112 may activate the time-sensitive malware signature with respect to the second target object in any of a variety of ways. For example, activation module 112 may exclude the second target object from a whitelist that prevents the time-sensitive malware signature from being actively applied against the listed target objects. In some examples, activation module 112 may actively apply the time-sensitive malware signature against the second target object rather than merely silently apply the time-sensitive malware signature against the second target object. For example, in the case in which the time-sensitive malware signature matches the second target object, systems described herein may perform one or more remediation actions against the second target object that may interfere with the operation of the second target object and/or with the ordinary operation of the computing environment. For example, these systems may remove, modify, quarantine, restrict, report, and/or sandbox the second target object.

Activation module 112 may activate the time-sensitive malware signature with any of a variety of time-sensitive approaches. For example, activation module 112 may activate the time-sensitive malware signature with respect to the second target object based at least in part on the receiving time preceding the second observation time. For example, activation module 112 may activate the time-sensitive malware signature with respect to the second target object based on the second target object arriving within the computing environment only after the time-sensitive malware signature was deployed to the computing environment. Additionally or alternatively, activation module 112 may activate the time-sensitive malware signature based on the second target object being checked against the time-sensitive malware signature (e.g., for the first time) after the time-sensitive malware signature had previously been applied to the entire computing environment (e.g., at least one time and/or over a minimum period of time).

As explained herein, the systems described herein may selectively apply time-sensitive malware signatures within a computing environment. In addition, in some examples the systems described herein may apply non-time-sensitive malware signatures within the computing environment. For example, systems described herein may (1) receive a non-time-sensitive malware signature at a second receiving time to apply to the computing environment, (2) apply the non-time-sensitive malware signature to the first target object regardless of a difference between the second receiving time and the first observation time, and (3) apply the non-time-sensitive malware signature to the second target object regardless of a difference between the second receiving time and the second observation time.

Figure 4:
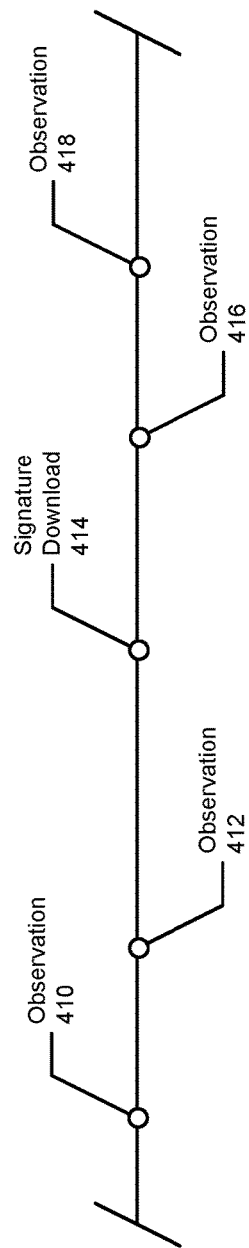
FIG. 4 is a block diagram of an exemplary timeline for selectively applying malware signatures.

FIG. 4 illustrates an exemplary timeline 400 for selectively applying malware signatures. As shown in FIG. 4, exemplary timeline 400 may include an observation 410, an observation 412, a signature download 414, an observation 416, and an observation 418. For example, a file A may first be observed within a computing environment (e.g., by an anti-malware system) at observation 410, a file B may first be observed within the computing environment at observation 412, a file C may be first observed within the computing environment at observation 416, and a file D may be first observed within the computing environment at observation 418. In one example, signature download 414 may include the download of various malware signatures to the computing environment (e.g., representing a signature update for the use of an anti-malware system within the computing environment), including some time-sensitive malware signatures. In this example, the time-sensitive malware signatures may apply only to files C and D which were introduced to the computing environment after signature download 414. In this manner, signature download 414 may avoid disrupting the computing environment with false positive identifications of files A and B. Because false positives of established system elements may impose a greater cost to a computing environment than false positives of newly introduced system elements, the systems described herein may thereby provide the computing environment with the immediate benefit of the time-sensitive malware signatures while limiting much of the potential cost of the time-sensitive malware signatures. In addition, non-time-sensitive malware signatures included in signature download 414 may equally apply to files A, B, C, and D, as the timing of the introduction of these files to the computing environment relative to the introduction of the non-time-sensitive malware signatures may be treated as irrelevant (e.g., the non-time-sensitive malware signatures may be activated for all files).

Figure 5:
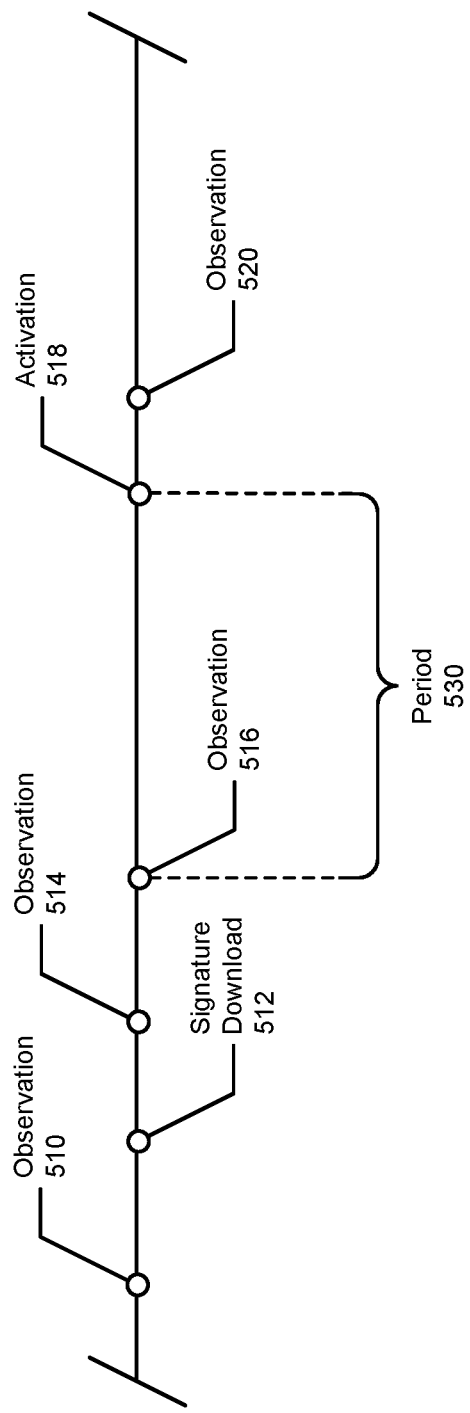
FIG. 5 is a block diagram of an exemplary timeline for selectively applying malware signatures.

FIG. 5 illustrates an exemplary timeline 500 for selectively applying malware signatures. As shown in FIG. 5, exemplary timeline 500 may include an observation 510, a signature download 512, an observation 514, an observation 516, an activation 518, and an observation 520. In one example, signature download 512 may include a time-sensitive malware signature to a computing environment. The time-sensitive malware signature may be deactivated with respect to a target object associated with observation 510 (because, e.g., the target object associated with observation 510 was already observed as established within the computing environment). In addition, the time-sensitive malware signature may not activate for any new (or apparently new) target objects for a predetermined amount of time. Accordingly, the time-sensitive malware signature may be deactivated (e.g., either temporarily or indefinitely) with respect to a target object associated with observation 514 that matches the time-sensitive malware signature and a target object associated with observation 516 that matches the time-sensitive malware signature. In some examples, systems described herein may send information regarding the target objects associated with observations 514 and 516 to the distributor of the time-sensitive malware signature. After a period 530 passes following observation 516 with no new observations implicating the time-sensitive malware signature (i.e., the time-sensitive malware signature does not match any new target objects observed over period 530), the time-sensitive malware signature may be activated at activation 518. Accordingly, an observation 520 associated with a target object that matches the time-sensitive malware signature may be subject to the time-sensitive malware signature as an active signature (e.g., the time-sensitive malware signature may trigger a remediation action that may disrupt the operation of the associated target object).

As explained above in connection with method 300 in FIG. 3, a time-delayed self-actuating (TDSA) signature may be released and an anti-malware product may register the first use of the TDSA signature. For a determined amount of time, any detections by the TDSA signature may be silently reported through the anti-malware product and/or registered to a local whitelist. Thus, the anti-malware product may account for all existing files that match the TDSA signature before the introduction of the TDSA signature. After a specified amount of quiet time (e.g., where there are no new detections involving the TDSA signature), the TDSA signature may turn itself on and join all other normal signature in the signature set.

Accordingly, those computing systems that would not have experienced false positives from a TDSA signature (e.g., had it been activated from the outset) may quickly activate the TDSA signature. Those computing systems that would have experienced false positive from the TDSA signature may maintain the TDSA signature as a silent signature, gathering intelligence that researchers may use to resolve and improve the TDSA signature if desired. Whether or not improvements to the TDSA signature are made, files that would have triggered a false positive from the TDSA signature may be placed on a local and/or global whitelist and the TDSA signature may be activated to address new and income potential malware. Computing systems may activate the TDSA signature automatically (e.g., without human intervention) based on attributes of the computing systems (e.g., the lack of potentially suspicious activity).

In some examples, systems described herein may construct a local whitelist or exceptions list based on specific TDSA signatures so that files may be exempted from specific TDSA signatures but not from other signatures (in case a file represents true malware and not merely a false positive).

Figure 6:
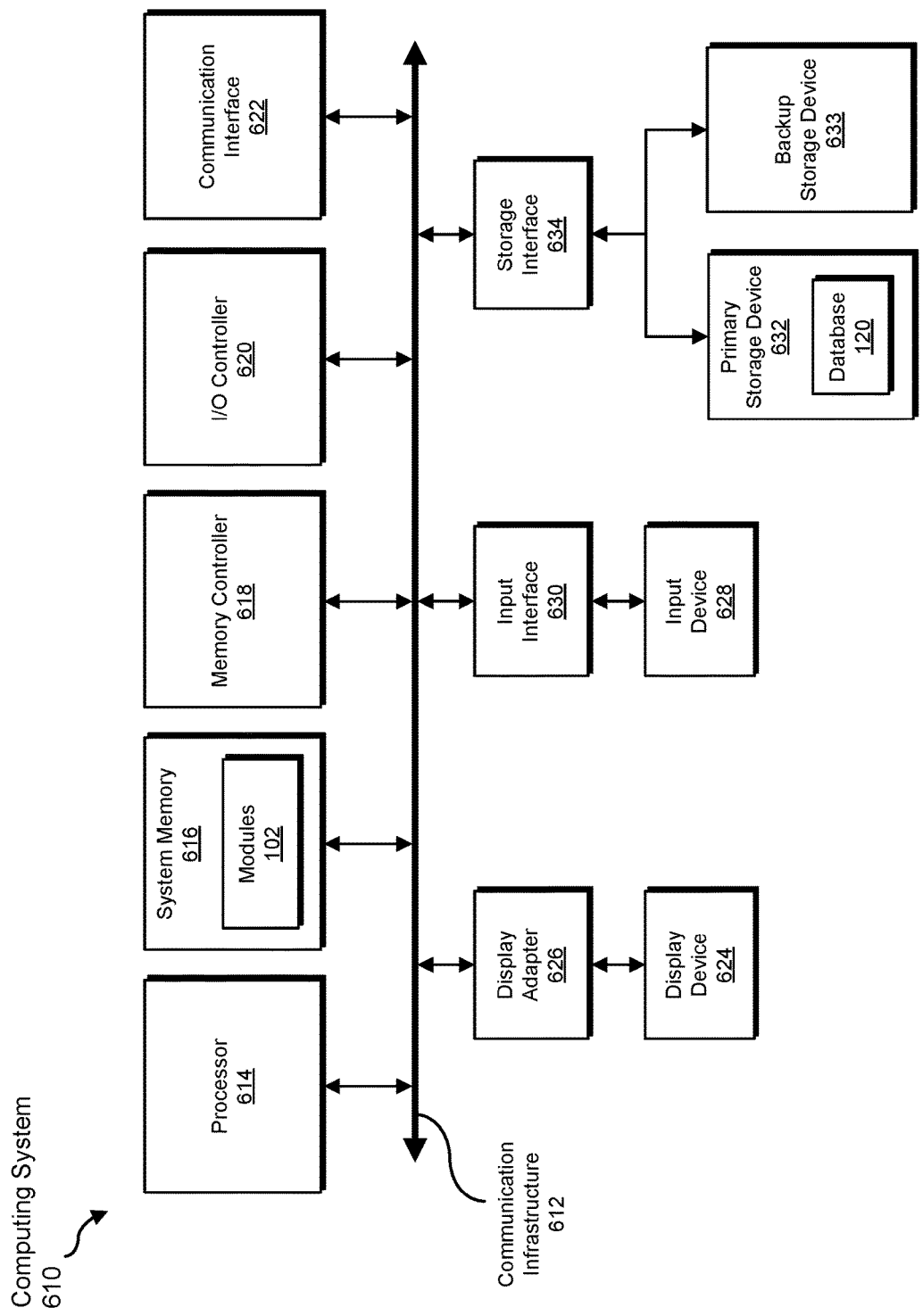
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
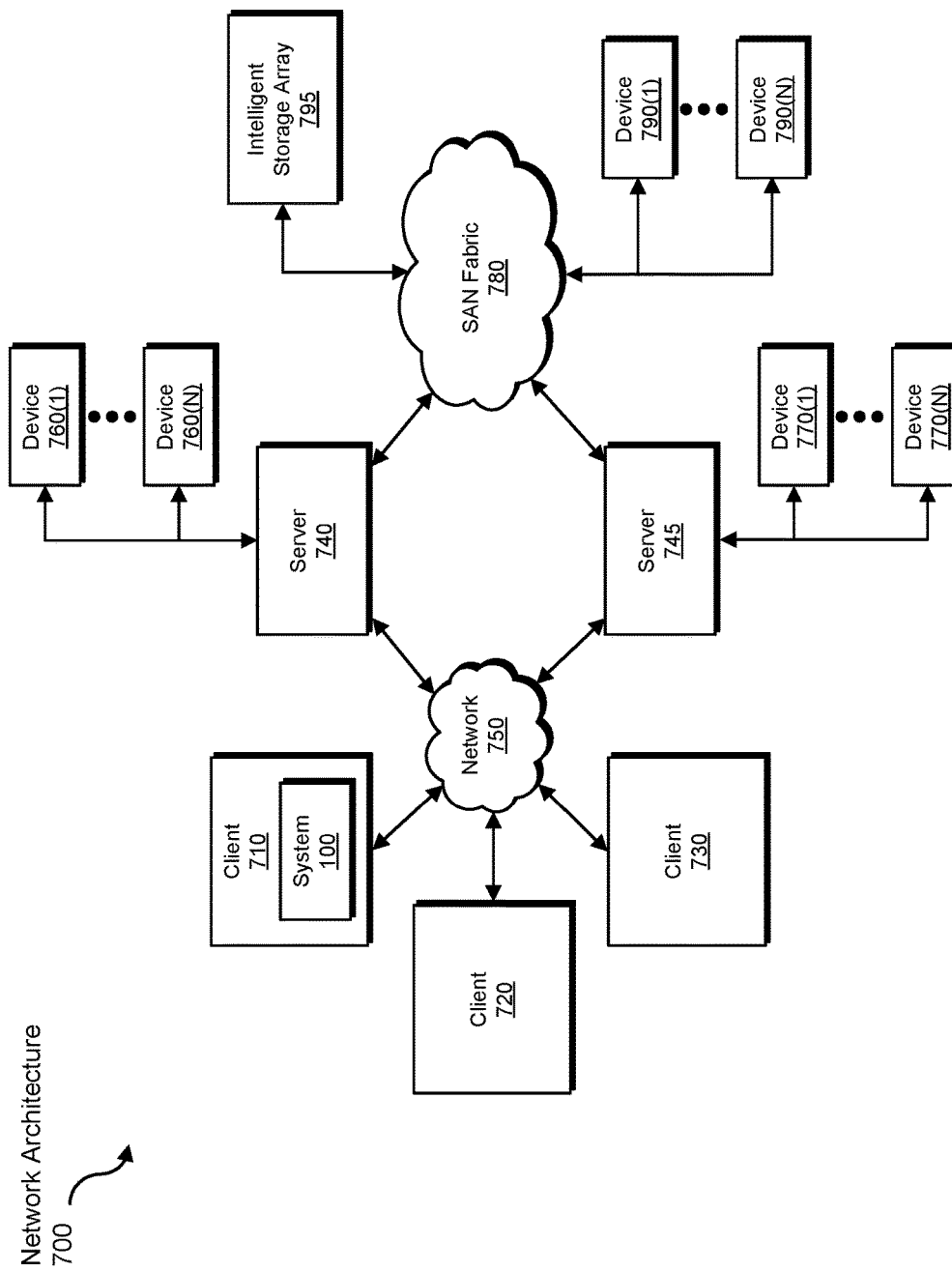
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for selectively applying malware signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a time-sensitive malware signature to be transformed, transform the time-sensitive malware signature, output a result of the transformation to an anti-malware system, use the result of the transformation to protect a computing environment from malware, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selectively applying malware signatures, at least a portion of the method being performed by a computing device comprising at least one processor, the method comprising:
   receiving a time-sensitive malware signature at a receiving time to apply to a computing environment;
   identifying a first target object within the computing environment subject to malware scans, the first target object being observed within the computing environment at a first observation time;
   deactivating the time-sensitive malware signature with respect to the first target object based at least in part on a difference between the receiving time and the first observation time, wherein the deactivation of the time-sensitive malware signature with respect to the first target object is set to end after a predetermined window of time;
   observing a second target object within the computing environment subject to malware scans, the second target object being observed within the computing environment at a second observation time that is later than the first observation time;
   activating the time-sensitive malware signature with respect to the second target object based at least in part on a difference between the receiving time and the second observation time;
   sending an indication to a distributor of the time-sensitive malware signature, while the time-sensitive malware signature is deactivated with respect to the first target object, that the time-sensitive malware signature matches the first target object;
   receiving from the distributor, in response to sending the indication, an instruction and preventing a subsequent application of the time-sensitive malware signature to the first target object.

2. The computer-implemented method of claim 1, wherein:
   deactivating the time-sensitive malware signature with respect to the first target object based at least in part on the difference between the receiving time and the first observation time comprises deactivating the time-sensitive malware signature with respect to the first target object based at least in part on the first observation time preceding the receiving time;
   activating the time-sensitive malware signature with respect to the second target object based at least in part on the difference between the receiving time and the second observation time comprises activating the time-sensitive malware signature with respect to the second target object based at least in part on the receiving time preceding the second observation time.

3. The computer-implemented method of claim 1, further comprising activating the time-sensitive malware signature with respect to the first target object after a predetermined window of time.

4. The computer-implemented method of claim 3, wherein the predetermined window of time ends after the time-sensitive malware signature does not match any observed target objects within the computing environment for a predetermined amount of time.

5. The computer-implemented method of claim 1, wherein:
   receiving the instruction comprises receiving from the distributor, in response to sending the indication, a modified version of the time-sensitive malware signature that does not match the first target object to replace the time-sensitive malware signature.

6. The computer-implemented method of claim 1, wherein:
   receiving the instruction comprises receiving from the distributor, in response to sending the indication, an instruction to extend the predetermined window of time and, thereby, delay activating the time-sensitive malware signature within the computing environment.

7. The computer-implemented method of claim 1, wherein:
   receiving the instruction comprises receiving from the distributor, in response to sending the indication, an instruction to include the first target object in a whitelist.

8. The computer-implemented method of claim 1, wherein deactivating the time-sensitive malware signature with respect to the first target object comprises silently comparing the time-sensitive malware signature to the first target object and sending a comparison result to a distributor of the time-sensitive malware signature.

9. The computer-implemented method of claim 1, wherein deactivating the time-sensitive malware signature with respect to the first target object comprises putting the first target object on a whitelist based at least in part on the difference between the receiving time and the first observation time.

10. The computer-implemented method of claim 9, wherein putting the first target object on the whitelist comprises putting the first target object on a whitelist specific to the time-sensitive malware signature that exempts the first target object from the time-sensitive malware signature.

11. The computer-implemented method of claim 1, further comprising:
receiving a non-time-sensitive malware signature at a second receiving time to apply to the computing environment;
applying the non-time-sensitive malware signature to the first target object regardless of a difference between the second receiving time and the first observation time;
applying the non-time-sensitive malware signature to the second target object regardless of a difference between the second receiving time and the second observation time.

12. A system for selectively applying malware signatures, the system comprising:
a receiving module, stored in memory, that receives a time-sensitive malware signature at a receiving time to apply to a computing environment;
an identification module, stored in memory, that identifies a first target object within the computing environment subject to malware scans, the first target object being observed within the computing environment at a first observation time;
a deactivation module, stored in memory, that deactivates the time-sensitive malware signature with respect to the first target object based at least in part on a difference between the receiving time and the first observation time, wherein the deactivation of the time-sensitive malware signature with respect to the target object is set to end after a predetermined window of time;
an observation module, stored in memory, that observes a second target object within the computing environment subject to malware scans, the second target object being observed within the computing environment at a second observation time that is later than the first observation time;
an activation module, stored in memory, that activates the time-sensitive malware signature with respect to the second target object based at least in part on a difference between the receiving time and the second observation time;
wherein the deactivation module further:
sends an indication to a distributor of the time-sensitive malware signature, while the time-sensitive malware signature is deactivated with respect to the first target object, that the time-sensitive malware signature matches the first target object;
receives from the distributor, in response to sending the indication, an instruction and preventing a subsequent application of the time-sensitive malware signature to the first target object
at least one physical processor configured to execute the receiving module, the identification module, the deactivation module, the observation module, and the activation module.

13. The system of claim 12, wherein:
the deactivation module deactivates the time-sensitive malware signature with respect to the first target object based at least in part on the difference between the receiving time and the first observation time by deactivating the time-sensitive malware signature with respect to the first target object based at least in part on the first observation time preceding the receiving time;
the activation module activates the time-sensitive malware signature with respect to the second target object based at least in part on the difference between the receiving time and the second observation time by activating the time-sensitive malware signature with respect to the second target object based at least in part on the receiving time preceding the second observation time.

14. The system of claim 12, the activation module activates the time-sensitive malware signature with respect to the first target object after a predetermined window of time.

15. The system of claim 14, wherein the predetermined window of time ends after the time-sensitive malware signature does not match any observed target objects within the computing environment for a predetermined amount of time.

16. The system of claim 14, wherein the deactivation module:
receives the instruction by receiving, from the distributor, in response to sending the indication, a modified version of the time-sensitive malware signature that does not match the first target object to replace the time-sensitive malware signature.

17. The system of claim 14, wherein the deactivation module:
receives the instruction by receiving, from the distributor, in response to sending the indication, an instruction to extend the predetermined window of time and, thereby, delay activating the time-sensitive malware signature within the computing environment.

18. The system of claim 14, wherein the deactivation module:
receives the instruction by receiving, from the distributor, in response to sending the indication, an instruction to include the first target object in a whitelist.

19. The system of claim 12, wherein the deactivation module deactivates the time-sensitive malware signature with respect to the first target object by silently comparing the time-sensitive malware signature to the first target object and send a comparison result to a distributor of the time-sensitive malware signature.

20. A non-transitory computer-readable medium comprising one or more computer-readable instructions that, when executed by at least one processor of a computing device, cause the computing device to:
receive a time-sensitive malware signature at a receiving time to apply to a computing environment;
identify a first target object within the computing environment subject to malware scans, the first target object being observed within the computing environment at a first observation time;
deactivate the time-sensitive malware signature with respect to the first target object based at least in part on a difference between the receiving time and the first observation time wherein the deactivation of the time-sensitive malware signature with respect to the first target object is set to end after a predetermined window of time;
observe a second target object within the computing environment subject to malware scans, the second target object being observed within the computing environment at a second observation time that is later than the first observation time;

activate the time-sensitive malware signature with respect to the second target object based at least in part on a difference between the receiving time and the second observation time;

send an indication to a distributor of the time-sensitive malware signature, while the time-sensitive malware signature is deactivated with respect to the first target object, that the time-sensitive malware signature matches the first target object;

receive from the distributor, in response to sending the indication, an instruction and preventing a subsequent application of the time-sensitive malware signature to the first target object.

* * * * *

UNITED STATES PATENT AND TRADEMARK OFFICE
CERTIFICATE OF CORRECTION

PATENT NO. : 10,032,023 B1
APPLICATION NO. : 15/080621
DATED : July 24, 2018
INVENTOR(S) : Kuo Page 1 of 1

It is certified that error appears in the above-identified patent and that said Letters Patent is hereby corrected as shown below:

In the Claims

In Column 24, Line 62, in Claim 20, delete "time wherein" and insert -- time, wherein --, therefor.

Signed and Sealed this
Thirtieth Day of October, 2018

Andrei Iancu
*Director of the United States Patent and Trademark Office*